UNITED STATES PATENT OFFICE.

FRANZ SMOLKA, OF VIENNA, AUSTRIA-HUNGARY.

MANUFACTURE OF MEAT-LIKE CONSERVES.

1,078,807. Specification of Letters Patent. Patented Nov. 18, 1913.

No Drawing. Application filed February 15, 1912. Serial No. 677,666.

*To all whom it may concern:*

Be it known that I, FRANZ SMOLKA, a subject of the Austrian Emperor, residing at Vienna, Austria-Hungary, have invented certain new and useful Improvements in Manufacture of Meat-Like Conserves, of which the following is a specification.

This invention relates to a process for the manufacture of a substance similar to meat from albuminous products of animal or vegetable origin. The substance manufactured by the process according to this invention, has an advantage over the conserves made from real meat in that while being of the same nutritive value, it is considerably cheaper and at the same time much more durable than real meat conserves.

It has been repeatedly suggested to use substances containing starch as an addition to meat products, for instance in the manufacture of sausages, or to add leguminous plants, for the purpose of thickening, to the preparation of sausage meat. According to the present invention material substantially similar to meat as regards smell, flavor and chemical composition is prepared from albuminous substances, saccharids and fats without any addition of meat.

As raw material for use in the process according to this invention meat extracts can be used as well as any albuminous extracts which contain substances of the same taste as the various meat extracts, for instance yeast extracts and extracts of milk and the like, similar to the meat extract. Hitherto such extracts have been converted by the addition of amylaceous substances, only into soup powder or meal and the like.

For carrying out the process, the extract in question is mixed with starch or dextrin or substances containing starch or dextrin, and then slowly heated at a gradually rising temperature until thickened sufficiently. The thick mass is then carefully dried if necessary, to the required extent, finely divided in the usual manner and finally mixed with fat. The finished mixture is then subjected to further treatment in a manner usual in sausage or meat conserve manufacture, for instance by stuffing it, after the addition of spices, into skins, and boiling and smoking.

The invention is carried out preferably by introducing vegetable fibers into the mass, for increasing its meat-like character, and thoroughly mixing the whole. For obtaining the fibers in question, potatoes for instance are ground and washed on sieves until all smelling substances are removed from the fiber together with the soluble portions. After drying, a fibrous material is obtained which swells up when boiled. For the purpose of manufacturing material for sausages, the fibers could be smoked.

As an example of carrying out the process the following may be mentioned. Whey extract obtained during the treatment of whey by removing the lactic sugar, is thoroughly mixed with double the quantity by weight of wheat starch in suspension in water, 10% of vegetable albumin being added, and the whole heated to about 80° C. The thickened lumpy mass is cooled and constantly stirred and then mixed with 25 parts by weight of fat and one part by weight of washed potato fibers, reduced on meat mincers mixed with spices, stuffed into skins and smoked.

Having now particularly described and ascertained the nature of my said invention and in what manner the same is to be performed, I declare that, what I claim is:—

1. The herein described process of manufacturing meat-like conserves from an albuminous extract and a suitable carbo-hydrate comprising heating the material until it becomes pasty, finely dividing the material, mixing it with fat, and subjecting the mixture to further treatment as in the manufacture of sausage or meat conserves.

2. The herein described process of manufacturing meat-like conserves from an albuminous extract and an amylaceous substance, comprising heating the material until it becomes pasty, finely dividing the material, and mixing fat with said finely divided material.

3. The herein described process of manufacturing meat-like conserves from an albuminous extract and starch, comprising heating and drying the material, finely dividing the dry material, mixing it with fat, and subjecting the mixture to further treatment as in the manufacture of sausage or meat conserves.

4. The herein described process of manufacturing meat-like conserves from an albuminous extract and a suitable carbo-hydrate comprising heating and drying the material, finely dividing the dry material, and mixing the finely divided material with fat and vegetable fibers from which all odorous and soluble matter has been removed, for the purpose described.

In testimony whereof I have affixed my signature in presence of two witnesses.

FRANZ SMOLKA.

Witnesses:
D. RICHARD REIK,
AUGUST FUGGER.

Copies of this patent may be obtained for five cents each, by addressing the "Commissioner of Patents, Washington, D. C."